United States Patent [19]

Shu et al.

[11] Patent Number: 4,940,091
[45] Date of Patent: Jul. 10, 1990

[54] METHOD FOR SELECTIVELY PLUGGING A ZONE HAVING VARYING PERMEABILITIES WITH A TEMPERATURE ACTIVATED GEL

[75] Inventors: Paul Shu, West Windsor, N.J.; Winston R. Shu, Dallas, Tex.

[73] Assignee: Mobil Oil Corporation, New York, N.Y.

[21] Appl. No.: 292,795

[22] Filed: Jan. 3, 1989

[51] Int. Cl.$^5$ .................... E21B 43/22; E21B 43/24; E21B 33/138
[52] U.S. Cl. .................... 166/270; 166/272; 166/273; 166/288; 166/295; 166/302; 166/303
[58] Field of Search ............... 166/270, 272, 273, 274, 166/288, 294, 295, 300, 302, 303; 523/130

[56] References Cited

U.S. PATENT DOCUMENTS

| | | | |
|---|---|---|---|
| Re. 30,767 | 10/1981 | Felber et al. | 166/272 X |
| 2,799,341 | 7/1957 | Maly | 166/288 |
| 3,490,533 | 1/1970 | McLaughlin | 166/275 X |
| 3,557,562 | 1/1971 | McLaughlin, Jr. et al. | |
| 3,669,188 | 6/1972 | Coles et al. | 166/272 X |
| 3,918,521 | 11/1975 | Snavely, Jr. et al. | 166/272 |
| 4,157,322 | 6/1979 | Colegrove | 166/295 |
| 4,440,228 | 4/1984 | Swanson | 166/272 |
| 4,479,894 | 10/1984 | Chen et al. | 252/8.554 |
| 4,489,783 | 12/1984 | Shu | 166/272 |
| 4,513,821 | 4/1985 | Shu | 166/273 |
| 4,565,249 | 1/1986 | Pebdani et al. | 166/303 |
| 4,569,393 | 2/1986 | Bruning et al. | 166/273 X |
| 4,640,357 | 2/1987 | Jones | 166/273 |
| 4,658,898 | 4/1987 | Paul et al. | 166/270 |
| 4,665,986 | 5/1987 | Sandiford | 166/288 |
| 4,716,966 | 1/1988 | Shu | 166/295 |
| 4,743,633 | 5/1988 | Navratil et al. | 166/295 X |
| 4,799,548 | 1/1989 | Mumallah et al. | 166/272 X |
| 4,804,043 | 2/1989 | Shu et al. | 166/288 X |

Primary Examiner—George A. Suchfield
Attorney, Agent, or Firm—Alexander J. McKillop; Charles J. Speciale; Charles A. Malone

[57] ABSTRACT

A process for closing pores in a heated steam swept zone of a formation having zones of varying permeabilities where a temperature activated aqueous gellable mixture is utilized following a steam flooding or steam stimulation enhanced oil recovery method. After being placed into the steam swept zone having varying permeabilities, a temperature above 300° F. activates components in the gellable mixture which causes a solid gel to form which closes pores in the steam swept zone. A spacer volume of cold water is pumped into the formation to remove any ungelled mixture. Steam is directed into an unswept zone and hydrocarbonaceous fluids recovered therefrom. Polymers utilized include polyvinyl alcohol and polyacrylamide cross-linked with phenol and an aldehyde producing compound sufficient to form a phenolic resin in situ.

20 Claims, 3 Drawing Sheets

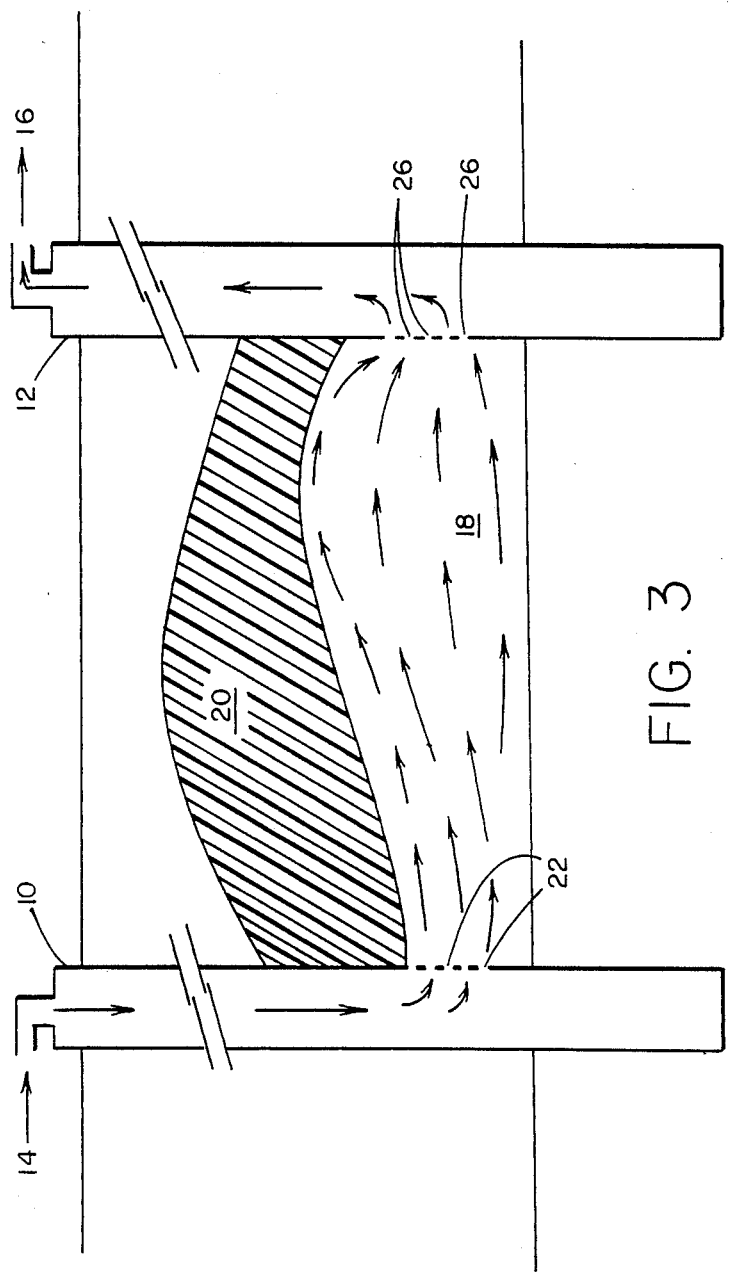

METHOD FOR SELECTIVELY PLUGGING A ZONE HAVING VARYING PERMEABILITIES WITH A TEMPERATURE ACTIVATED GEL

RELATED APPLICATIONS

This application is related to copending application Ser. No. 068,290, now U.S. Pat. No. 4,804,043 filed July 1, 1987. It is also related to Ser. No. 292,845 which was filed on Jan. 3, 1989. Additionally, it is related to Ser. No. 292,799 which was filed on Jan. 3, 1989.

FIELD OF THE INVENTION

This invention relates to the use of temperature activated gels that can be used for profile control after a steam flood so that increased amounts of hydrocarbonaceous fluids can be obtained from a steam underswept zone in a formation.

BACKGROUND OF THE INVENTION

In the recovery of oil from oil-containing formations, it is usually possible to recover only minor portions of the original oil-in-place by so-called primary recovery methods which utilize only natural forces. To increase the recovery of oil a variety of supplementary recovery techniques are employed. These techniques include waterflooding, miscible flooding, and thermal recovery.

A problem that arises in various flooding processes is that different strata or zones in the reservoir often possess different permeabilities. Thus, displacing fluids enter high permeability or "thief" zones in preference to zones of lower permeability. Significant quantities of oil may be left in zones of lower permeability. To circumvent this difficulty the technique of profile control is applied to plug the high permeability zones with polymeric gels and thus divert the displacing fluid into the underswept low permeability, oil rich zones. Among the polymers examined for improving waterflood conformance are metal cross-linked polysaccharides, metal cross-linked polyacrylamides, and organic-crosslinked polyacrylamides.

Polymeric gels are disclosed in several U.S. patents. Among these is U.S. Pat. No. 4,157,322 which issued to Colegrove on June 5, 1979. This gel is formed from water, a polysaccharide polymer, an acid generating salt and a melamine resin. A polymeric gel is disclosed in U.S. Pat. No. 4,658,898 which issued to Paul et al. on Apr. 21, 1987. This patent discloses an aqueous solution of heteropolysaccharide S-130 combined with cations of basic organic compounds which cations contained at least two positively charged centers. U.S. Pat. No. 4,716,966, issued to Shu on Jan. 5, 1988, discloses a gel formed by amino resins such as melamine formaldehyde which modify biopolymers in combination with transitional metal ions. These patents are hereby incorporated by reference herein.

Basic to the problem of diverting displacing fluid with polymeric gels is the necessity of placing the polymer where it is needed, i.e. in the high permeability zone. This is possible when xanthan biopolymers are cross-linked with metal ions such as $Cr^{+3}$ above ground to give gels. These gels are shear stable and shear thinning. They can be injected into the formation where they then reheal. Due to the gel's reological properties, they will of necessity go into high permeability zones. However, many other gel systems are formed in-situ. One system disclosed in U.S. Pat. No. 3,557,562 contains acrylamide monomer, methylene-bis-acrylamide as an organic cross-linker, and a free radical initiator. This system undergoes polymerization in the formation to give a polyacrylamide cross-linked with methylene-bis-acrylamide. However, the viscosity of the solution when injected is like that of water. Unless mechanical isolation is used, these solutions are quite capable of penetrating low permeability, oil bearing zones. Another form of in-situ gelation involves the injection of polyacrylamide containing chromium in the form of chromate. A reducing agent such as thiourea or sodium thiosulfate is also injected to reduce the chromate in-situ to $Cr^{+3}$, a species capable of cross-linking hydrolyzed polyacrylamide. Even though the polyacrylamide solution has a viscosity greater than water, it is not capable of showing the selectivity that a gel can. Thus, polyacrylamides cross-linked with chromium in-situ can also go into low permeability zones. It is not useful to cross-link polyacrylamides above ground and inject them as gels, because polyacrylamide gels undergo shear degradation. There are very few gels that are selective and thermally stable.

In addition to the creation of "thief" zones during a waterflooding recovery technique, steam flooding or steam stimulation processes create a unique situation in a formation which is gravity override due to the steam's low density. Because of the steam's low density, the sweep path of the steam is therefore biased towards the top of the payzone. Thus, the area invaded by the override steam may or may not be of low permeability. Although steam preferentially enters a high permeability or thief zone, the high temperature of the steam will also remove hydrocarbonaceous fluids from portions of low permeability zones. As the distance increases from steam entry into the formation, the temperature will decrease. As long as the temperature is hot enough hydrocarbonaceous fluids will be removed from the "thief" zone as well as portions of low permeability zones.

When steam has broken through to a production well during a steamflood, a heated portion of the formation will communicate with an injector well. This heated portion may include portions of both high and low permeability steam override zones. For this reason, a gel system which can selectively enter a high permeability "thief" zone may not enter a low permeability zone. Thus, a size selective gel may not prevent steam from entering into a heated low permeability zone which has been depleted of hydrocarbonaceous fluids.

Therefore, what is needed is a method whereby a gel forms in-situ in a steam overswept zone of a formation only when said zone has been previously heated during a steamflood enhanced oil recovery process regardless of its permeability.

SUMMARY

This invention is directed to a method for closing pores in a heated steam overswept zone which composition comprises a temperature activated gellable mixture which forms a solid gel. In one embodiment of this invention, the more permeable and the override zones are heated during a steam flooding enhanced oil recovery (EOR) process. Due to preferential steam flow through said zones, such zones are overswept by steam. Therefore, they are more oil-depleted. Once the steam flow is stopped, the heat activated gellable mixture is injected into the formation. When the gellable mixture has travelled the desired distance into the formation, injection of said gellable mixture is ceased. Heat emitted from the steam overswept zone activates the gellable mixture upon reaching a temperature of above 300° F. thereby causing it to form a solid gel and close pores in the steam overswept zone.

Gellable aqueous compositions which can form a solid gel upon reaching a temperature above 300° F. are comprised of selected water dispersible polymers, phenolic compounds, and aldehyde producing compounds. Polymers which are utilized herein are selected from a member of the group consisting of polyvinyl alcohol, polyvinyl alcohol copolymers, polyacrylamide, polyvinyl amine, sulfonated polyvinyl alcohol, and poly (acrylamide-co-acrylamido-2-methylpropane sulfonate). Phenolic compounds which can be used include phenol, catechol, resorcinol, phloroglucinol, 4,4'-diphenol, 1,3-dihydroxynaphthalene, and related similar compounds. Aldehyde producing compounds which can be utilized herein upon reaching a temperature above about 300° F. include trioxane and paraformaldehyde, tetraoxane.

It is therefore an object of this invention to provide for a temperature activated gellable composition which can be delivered into a heated steam overswept zone having a temperature sufficient to activate said composition and selectively form a solid gel therein.

It is another object of this invention to provide for a temperature activated gellable composition which can be delivered into a formation's steam override zone having a temperature above about 300° F. and thereafter form a solid gel therein.

It is yet another object of this invention to provide for a composition which avoids forming a solid gel in a steam underswept zone of lesser permeability or a low temperature zone of a formation.

It is another further object of this invention to provide for a composition that will minimize gel damage to a zone of lower permeability while closing pores in a higher permeability zone having a temperature above about 300° F.

It is still another object of this invention to inject a temperature activated gellable composition into a producer well and cause a solid gel to form so as to divert sweep fluids into an unswept formation zone.

It is a still yet further object of this invention to provide for a composition which will increase the efficiency of a drive fluid through a formation thereby increasing the yield of hydrocarbonaceous fluids therefrom.

BRIEF DESCRIPTION OF THE DRAWINGS

FIG. 3 is a diagrammatic plan view where the high permeability and override zones have been closed with a temperature activated gel while steam is passing through a low permeability zone or area.

DESCRIPTION OF THE PREFERRED EMBODIMENTS

Figure 1:
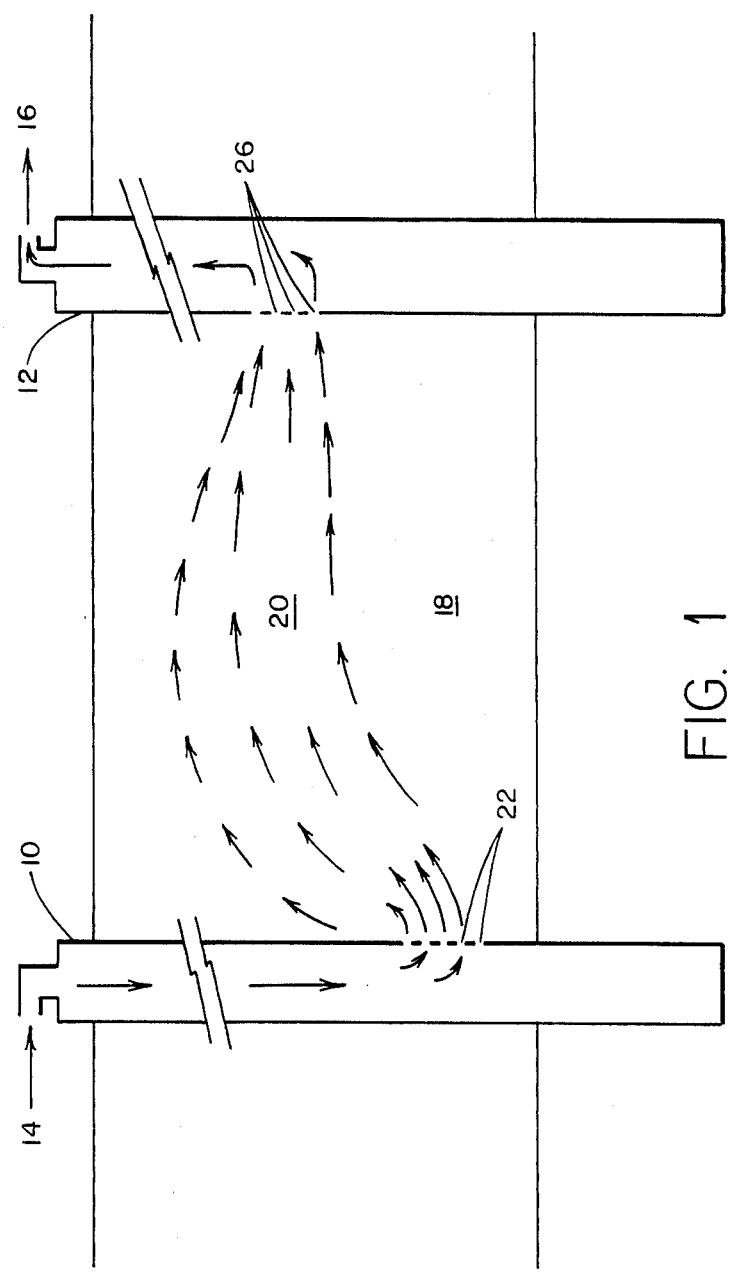
FIG. 1 is a diagrammatic plan view of a formation where steam has passed through a high permeability zone and its override area into a production well.
Figure 2:
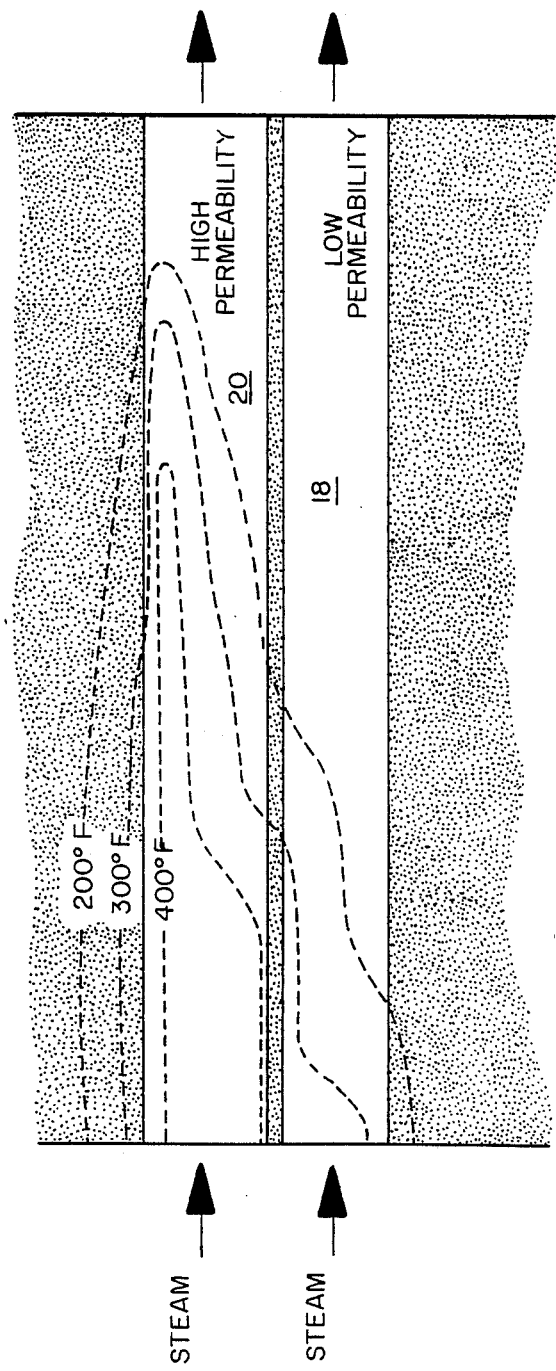
FIG. 2 is a schematic representation which illustrates temperatures distribution into high and low permeability zones of a formation during steam flooding.

During the recovery of hydrocarbonaceous fluids from a formation wherein a steam flooding process is utilized, as is shown in FIG. 1, steam enters conduit 14 of injection well 10. Afterwards, steam exits injection well 10 via perforations 22 and enters high permeability zone 20. Steam and hydrocarbons obtained from high permeability zone 20 exit through production well 12 via perforations 26. Thereafter, steam and hydrocarbonaceous fluids exit production well 12 via conduit 16. During this steam flooding process, the formation is heated up by the steam. While being heated, a temperature contour is developed in the steam flooded formation. Thus, the "thief" zones and zones swept by override steam have the highest temperatures in the formation while the underswept parts in the formation have the lowest. This concept is illustrated in FIG. 2. When it becomes uneconomical to continue injecting steam to recover hydrocarbonaceous fluids from high permeability zone 20, high permeability or overswept zone 20 is closed so that hydrocarbonaceous fluids can be removed from low permeability zone 18. Closing of the overswept zone is depicted in FIG. 3. In the practice of this invention, an aqueous gellable temperature activated mixture is injected via conduit 14 into injection well 10 where it enters high permeability or overswept zone 20. When the gellable temperature activated mixture comes into contact with heated high permeability or overswept zone 20, components in the aqueous gellable mixture form a solid gel which blocks pores in high permeability zone 20. Due to the high porosity of high permeability or overswept zone 20, the aqueous gellable mixture preferentially enters high permeability zone 20. This aqueous gellable mixture is injected into the high permeability or overswept zone 20 after the steam flooding operation has been caused.

Once in high permeability zone 20, the aqueous gellable mixture is allowed sufficient time to form a solid gel. Generally the solid gel will form at a temperature greater than about 300° F. in about from 1 to about 20 days. Although some of the aqueous gellable mixture may enter low permeability or underswept zone 18, it will not form a gel in that portion of low permeability zone 18 where the temperature is too low. Any gellable mixture which enters low permability zone 18 where the temperature is too low for gelation can be removed therefrom by pumping a spacer volume of cold water therethrough so as to make the mixture ungellable. An additional benefit of the ungelled aqueous mixture is that being viscous it can act as a mobility control agent so as to facilitate the removal of hydrocarbonaceous fluids from low permeability zone 18. Alternatively, any ungelled materials can be pumped out or produced back to the surface if the producer well is treated. If the gellable compositions are used in conjunction with a water-alternating-gas (WAG) process, the ungelled material need not be pumped or removed from the formation since it can advantageously act as a mobility control agent. A WAG process is discussed in U.S. Pat. No. 4,640,357 which is incorporated by reference herein in its entirety.

Aqueous gellable temperature activated compositions which can be utilized herein are comprised of a polymer, a phenolic compound, and an aldehyde. Polymers utilized herein are water dispersible polymers. The term "polymer" is employed generically to include both homopolymers and copolymers. The term "water-dispersible polymers" is used generically to include those polymers which are truly water-soluble and those polymers which are dispersible in water or in other aqueous medium to form stable colloidal suspensions which can be gelled. Also, the term "aqueous dispersion" is utilized generically to include both true solutions and stable colloidal suspensions of components of the composition of this invention which can be gelled as will be described herein. Water-dispersible polymers which are used herein are selected from a member of the group consisting of polyvinyl alcohol, polyacrylamide, sulfonated polyvinyl alcohol, and poly(acrylamide-co-acrylamido-2-methylpropane sulfonate). Polyvinyl alcohol (PVA) at various degrees of hydrolysis are useful. Other polymers containing OH, $NH_2$, $CONH_2$, and SH are also useful. Polyvinyl amine, and copolymers containing the previously mentioned functional groups are useful. Any of these water-dispersible polymers are placed into an aqueous mixture in amount of from about 0.5 to about 10.0 wt.%. The aqueous medium can comprise fresh water, brackish water, or sea water, and mixtures thereof. Polyacrylamide and poly(2-acrylamido-2-methylpropane sulfonate) are discussed in U.S. Pat. No. 4,440,228 which issued on Apr. 3, 1984 to Swanson. This patent is hereby incorporated herein in its entirety.

After placing the selected water-dispersible polymer into the aqueous medium, a phenolic compound is added to the mixture. Phenolic compounds which can be used herein include phenol, naphthol, catechol, resorcinol, phloroglucinol, 4,4'-diphenol, 1,3-dihydroxynaphthalene, and related similar compounds. The amount of phenolic compound utilized should be in excess of 0.5 wt.% or higher. The amount of phenolic compound used herein should be sufficient to impart the desired gelation effect within the desired time period.

Once the phenolic compound has been added, a water-dispersible aldehyde producing compound is mixed into the aqueous mixture. Representative examples of such aldehydes producing compounds include trioxane, tetraoxane, polyoxymethylene, and other aldehyde precursors. The term "water-dispersible" is employed generically to include aldehyde producing compounds which are truly water-soluble and those aldehydes of limited water solubility but which are dispersible in water or other aqueous media so as to be effective gelling agents. The preferred aldehyde is trioxane.

Any suitable amount of trioxane and phenolic compounds can be utilized herein. In all instances, the amount of aldehyde and phenolic compound used should be in an amount sufficient to cause gelation of an aqueous dispersion of a polymer, the aldehyde, and the phenolic compound. As a general guide, the amount of aldehyde used in prepared the gel compositions herein will be in the range of from about 0.5 to about 10.0, preferably 1.0 to about 5.0 wt.% based on the total weight of the composition.

A preferred temperature activated gellable mixture comprises polyvinyl alcohol, phenol, and trioxane. The effect of temperature on said mixture is shown in Table 1. When exposed to a formation having a temperature of about 300° to about 350° F. or higher, a firm gel will form in about 1 day to about 15 days when 0.05 to about 0.5 wt.% of sodium hydroxide is utilized as is shown in Table 2. Polyvinyl alcohol is used in amounts of about 0.5 to about 5.0 wt.%. Phenol is used in about 0.5 to about 5.0 wt.% or higher. The phenol to trioxane ratio is about 0.5 to 1.5, preferably about 1.0. The polyvinyl alcohol/phenol weight ratio is from about 0.2 to about 2. Of course, a lower ratio is used when other higher molecular weight polymers are utilized. The total concentration of polymer, phenol, and trioxane is directly proportional to the gel strength. A rigid gel is formed which is proportional to the total materials content.

TABLE 1

| Temperature Sensitivity of PVA Phenol/Trioxane* Gelation | | | | | |
|---|---|---|---|---|---|
| Temp, °F. | 200 | 300 | 350 | 400 | 450 |
| Gel Time, days | no gel | no gel | 1 | 1 | 1 |

*2.5% PVA, 4% phenol, 3% trioxane

TABLE 2

| Effect of NaOH Concentration on Gel* Time | | | | |
|---|---|---|---|---|
| NaOH, % | 300° F. | 350° F. | 400° F. | 450° F. |
| 0.05 | No gel | 15 days | 8–9 days | 4 days |
| 0.1 | " | 15 days | 5–7 days | 2 days |
| 0.2 | " | 12 days | 2 days | 1 day |
| 0.3 | " | 9 days | 1 day | 1 day |
| 0.5 | " | 6 days | 1 day | 1 day |

*2.5% PVA, 4% phenol, 3% trioxane

Prior to injecting the aqueous temperature activated gellable mixture, the formation is heated as mentioned above during the steam flooding enhanced oil recovery process. A formation temperature of about 300° F. or greater is preferred. The method of this invention can also be used when the area in or substantially near either the injection well or the production well has been heated to the desired temperature. This method is particularly beneficial when it is desired to close the heated area around a production well which has suffered a premature steam breakthrough. In this situation, steam injection is ceased and the temperature activated gellable mixture is injected into the production well for a time sufficient to enter the areas which comprise the premature breakthrough zone. Afterwards the gellable mixture in that zone is allowed to form a solid gel. Once the solid gel is formed, an enhanced oil recovery method in which a drive fluid is utilized can be injected either through the injection well or the production well to recover hydrocarbonaceous fluids from a less permeable zone of the formation.

As demonstrated, the novelty of this invention is that the cross-linking reaction is activated at elevated temperatures greater than about 300° F. The cross-linking reaction is not activated at temperatures under 300° F. At high temperatures, trioxane, a cyclic dimer of formaldehyde decomposes to yield formaldehyde which in turn reacts with phenol to form phenolic resin, the gelant, in situ. Phenolic resin then gels the polymer.

Where it is desired to obtain increased sweep efficiency, gels of this invention can be used to plug a previously sweep portion of a formation which has been heated to a temperature in excess of 300° F. Said gels can be directed to areas of increased porosity. Once a solid gel has formed, hydrocarbonaceous fluids can be removed from an area of lesser permeability or an underswept zone by utilization in any of the below methods.

One method where gels of this invention can be utilized is prior to a waterflooding process for the recovery of oil from a subterranean formation. After plugging the more permeable zones of a heated formation with the novel gels of this invention, a waterflooding process can be commenced. U.S. Pat. No. 4,479,894, issued to Chen et al., describes one such waterflooding process. This patent is hereby incorporated by reference in its entirety.

Steamflood processes which can be utilized when employing the gels described herein are detailed in U.S.

Pat. Nos. 4,489,783 and 3,918,521 issued to Shu and Snavely, respectively. These patents are hereby incorporated by reference herein.

Gels described herein can also be used in conjunction with a cyclic carbon dioxide steam stimulation process to recover heavy oil from a lower permeability zone to obtain greater sweep efficiency. Cyclic carbon dioxide steam stimulation can be commenced after plugging the more permeable zones of the reservoir with the novel temperature activated gels of this invention. A suitable process is described in U.S. Pat. No. 4,565,249 which issued to Pebdani et al. This process relates to a carbon dioxide-steam push-pull or "huff and puff" stimulation method for the recovery of viscous oil from a subterranean viscous oil-containing formation wherein a specific ratio of carbon dioxide to steam is used to obtain maximum oil recovery. This patent is hereby incorporated by reference in its entirety. Increased sweep efficiency can be obtained when the subject gels are used in combination with a carbon dioxide process by lowering the minimum miscibility pressure ("MMP") with carbon dioxide and recovering oil. Prior to commencement of the carbon dioxide process, a more permeable or overswept zone is heated and subsequently plugged with these novel gels. Carbon dioxide MMP in an oil recovery process is described in U.S. Pat. No. 4,513,821 issued to Shu which patent is hereby incorporated by reference.

Although the present invention has been described with preferred embodiments, it is to be understood that modifications and variations may be resorted to without departing from the spirit and scope of this invention, as those skilled in the art will readily understand. Such modifications and variations are considered to be within the purview and scope of the appended claims.

What is claimed is:

1. A method for closing pores in a heated zone of a formation having zones of varying permeability comprising:
   (a) heating by steam injection a zone of said formation to a temperature above about 300° F. sufficient to cause a temperature activated aqueous gellable mixture to form a solid gel which mixture contains
      (i) a water dispersible polymer,
      (ii) a phenolic compound, and
      (iii) an aldehyde producing compound which upon reaching a temperature above about 300° F. decomposes to yield an aldehyde and form a phenolic resin in situ in combinaton with the phenolic compound sufficient to gel the polymer;
   (b) terminating steam injection into the formation upon reaching said temperature; and
   (c) injecting thereafter into said formation the temperature activated gellable mixture which mixture enters said zone heated to said temperature, where it is heated to a temperature sufficient to cause a solid gel to form and close pores in said heated zone regardless of the permeability of said zone.

2. The method as recited in claim 1 where a spacer volume of cold water is pumped into the formation after step (c) which keeps any ungelled mixture from forming a solid gel.

3. The method as recited in claim 1 where a steam flooding or a steam stimulation enhanced oil recovery process is commenced after step (c).

4. The method as recited in claim 1 where the gellable mixture comprises water, polyvinyl alcohol, phenol, and trioxane which forms a solid gel at a temperature of about 300° F. or greater.

5. The method as recited in claim 1 where the gellable mixture comprises water, polyvinyl alcohol, phenol, and trioxane where the polyvinyl alcohol to phenol ratio is about 0.2 to about 2.0, the phenol to trioxane ratio is about 0.5 to about 1.5 and a gel forms in from about 1 to about 15 days with the addition of about 0.05 to about 0.5 wt.% of sodium hydroxide.

6. The method as recited in claim 1 where after step (c) a drive fluid is injected into a low temperature zone of lesser permeability in said formation where the gellable mixture does not form a gel but serves as a mobility control agent to enhance the recovery of hydrocarbonaceous fluids.

7. The method as recited in claim 1 where said gellable mixture comprises a polymer such as polyacrylamide, sulfonated polyvinyl alcohol, poly(acrylamide-co-acrylamido-2-methylpropane sulfonate) cross-linked with a phenolic resin which is formed in situ.

8. The method as recited in claim 1 where the aldehyde containing compound is trioxane, tetroxane, polyoxymethylene, or other similar aldehyde producing compound.

9. A method for closing pores in a heated zone of a formation having zones of varying permeability comprising:
   (a) heating a zone in said formation by steam injection to a temperature greater than about 300° F. which temperature is sufficient to activate a gellable mixture and cause it to form a solid gel;
   (b) terminating steam injection into the formation upon reaching said temperature;
   (c) injecting thereafter into the formation a temperature activated gellable aqueous mixture which contains sufficient amounts of a polymer selected from a member of the group consisting of polyvinyl alcohol, polyacrylamide, sulfonated polyvinyl alcohol, and poly(acrylamide-co-acrylamido-2-methylpropane sulfonate) cross-linked with a phenolic compound and an aldehyde producing compound which decomposes to yield an aldehyde in situ thereby forming a phenolic resin in situ in an amount sufficient to form a solid gel in combination with said polymer upon reaching a temperature of about 300° F. thereby closing pores in said heated zone regardless of the permeability of said zone; and
   (d) directing a drive fluid into a zone which has not reached a temperature sufficient to cause gelation and removing any ungelled mixture and hydrocarbonaceous fluids therefrom.

10. The method as recited in claim 9 where a spacer volume of cold water is pumped into the formation after step (c) which keeps any ungelled mixture from forming a solid gel.

11. The method as recited in claim 9 where a steam flooding or a steam stimulation enhanced oil recovery process is commenced after step (c).

12. The method as recited in claim 9 where the polyvinyl alcohol to phenol ratio is about 0.2 to about 2.0, the phenol to trioxane ratio is about 0.5 to about 1.5, and a gel forms in from about 1 to about 15 days when sodium hydroxide in about 0.05 to about 0.5 wt.% is added to the gellable mixture.

13. The method as recited in claim 9 where said drive fluid is derived from a carbon dioxide or water flood enhanced oil recovery process.

14. The method as recited in claim 9 where the gellable mixture does not form a gel but serves as a mobility control agent to enhance the recovery of hydrocarbonaceous fluids from said zone of lesser permeability.

15. The method as recited in claim 9 where said polymer is contained in the mixture in from about 0.5 to about 5.0 wt.%.

16. The method as recited in claim 9 where said aldehyde is a member selected from the group consisting of aldehydes such as trioxane, tetroxane, polyoxymethylene, and other similar aldehyde producing compounds which aldehyde is contained in said gellable mixture in about 0.5 to about 5.0 wt.%.

17. The method as recited in claim 9 where the phenolic compound is contained in said gellable mixture in about 0.5 to about 5.0 wt.% and is a member selected from the group consisting of phenol, naphthol, catechol, resorcinol, phloroglucinol, pyrogallol, 4,4'-diphenol, and 1,3-dihydroxynaphthalene.

18. A method for closing pores in a zone of a formation having varying permeabilities which has a temperature greater than about 300° F. comprising:
(a) conducting a steam flooding or steam stimulation enhanced oil recovery process in a formation until steam breakthrough occurs;
(b) ceasing injection of steam into the formation;
(c) injecting a temperature activated gellable mixture into the formation which mixture comprises water, polyvinyl alcohol, phenol and trioxane which produces an aldehyde in an amount sufficient to form a phenolic resin in situ in combination with said phenol which resin cross-links with said alcohol at a temperature greater than about 300° F. thereby forming a solid gel in a zone of said formation having a temperature greater than about 300° F. regardless of the permeability of said zone;
(d) injecting cold water into the formation in an amount sufficient to prevent any ungelled mixture from forming a solid gel; and
(e) injecting thereafter steam into the formation which enters a zone of the formation where the temperature was not previously heated above about 300° F. and removing hydrocarbonaceous fluids therefrom.

19. The method as recited in claim 18 where steam is injected into the formation via an injection well and hydrocarbonaceous fluids are produced therefrom by a production well.

20. The method as recited in claim 18 where the polyvinyl alcohol to phenol ratio is about 0.2 to about 2.0, the phenol to trioxane ratio is about 0.5 to about 1.5, and a gel forms in from about 1 to about 15 days with the addition of about 0.05 to about 0.5 wt.% of sodium hydroxide.

* * * * *